(12) United States Patent
Pera et al.

(10) Patent No.: US 9,139,109 B2
(45) Date of Patent: Sep. 22, 2015

(54) DRIVE DEVICE WITH ELECTRIC MOTOR AND REDUCTION GEAR

(75) Inventors: Thierry Pera, Belfort (FR); Nicolas Navatte, Conde sur Noireau (FR); Julien Denis, Lublin (PL)

(73) Assignee: Faurecia Sièges d'Automobile, Nanterre (FR)

( * ) Notice: Subject to any disclaimer, the term of this patent is extended or adjusted under 35 U.S.C. 154(b) by 58 days.

(21) Appl. No.: 14/234,093

(22) PCT Filed: Jun. 21, 2012

(86) PCT No.: PCT/FR2012/051415
§ 371 (c)(1),
(2), (4) Date: Jan. 21, 2014

(87) PCT Pub. No.: WO2013/011218
PCT Pub. Date: Jan. 24, 2013

(65) Prior Publication Data
US 2014/0167475 A1    Jun. 19, 2014

(30) Foreign Application Priority Data

Jul. 21, 2011   (FR) .................................. 11 56628

(51) Int. Cl.
*B60N 2/02* (2006.01)
*B60N 2/225* (2006.01)
*H02K 7/116* (2006.01)
*H02K 11/00* (2006.01)
(Continued)

(52) U.S. Cl.
CPC .............. *B60N 2/0232* (2013.01); *B60N 2/225* (2013.01); *H02K 7/116* (2013.01); *H02K 7/14* (2013.01); *H02K 11/0073* (2013.01); *B60N 2002/024* (2013.01); *B60N 2002/0236* (2013.01); *F16H 7/023* (2013.01); *F16H 49/001* (2013.01)

(58) Field of Classification Search
CPC ..... B60N 2/2213; B60N 2/225; B60N 2/2252
See application file for complete search history.

(56) References Cited

U.S. PATENT DOCUMENTS 5,209,637 A  *  5/1993  Reubeuze ..................... 475/176
6,390,556 B1 *  5/2002  Moradell ...................... 297/362

(Continued)

FOREIGN PATENT DOCUMENTS

| DE | 102006007755 A1 | 8/2007 |
| WO | WO2008028591 A1 | 3/2008 |
| WO | WO2010029010 A2 | 3/2010 |

OTHER PUBLICATIONS

International Search Report for PCT/FR2012/051415 dated Jul. 31, 2013, 3 pages—translated.

(Continued)

*Primary Examiner* — Philip Gabler
(74) *Attorney, Agent, or Firm* — Reising Ethington P.C.

(57) ABSTRACT

Drive device (1) with electric motor and reduction gear driving an output unit (8) in a motor vehicle, comprising a brushless motor (2) having a rotor turning about a rotor axis (Y2) parallel to a main axis (Y), an elliptical reduction gear (3) interposed between the brushless motor (2) and the output unit (8), said elliptical reduction gear comprising an elliptical gear and a deformable flange, deformed by the elliptical gear when it rotates, and a control unit (4) arranged in the immediate proximity of the brushless motor (2) for controlling said brushless motor. Seat frame comprising such a device.

8 Claims, 8 Drawing Sheets

(51) Int. Cl.
*H02K 7/14* (2006.01)
*F16H 49/00* (2006.01)
*F16H 7/02* (2006.01)

(56) References Cited

U.S. PATENT DOCUMENTS

2006/0205559 A1  9/2006  Sesselmann
2007/0029893 A1  2/2007  Schuler et al.
2010/0222174 A1* 9/2010  Brehm et al. ................. 475/163
2011/0169312 A1* 7/2011  Desquesne et al. ........... 297/362
2013/0180348 A1* 7/2013  Andres et al. ................ 74/89.14

OTHER PUBLICATIONS

Written Opinion for PCT/FR2012/051415 dated Jul. 31, 2013, 6 pages—translated.

* cited by examiner

DRIVE DEVICE WITH ELECTRIC MOTOR AND REDUCTION GEAR

TECHNICAL FIELD

The present invention relates to drive devices with electric motor and reduction gear, for driving an element in a motor vehicle, for example for moving a movable element relative to a reference element.

It relates more particularly to a drive device causing a motorized hinge mechanism connecting one part of a vehicle seat to another part of the seat, such as the backrest to the seating part of the seat.

BACKGROUND

In the known prior art, these motorized hinges comprise a DC (direct current) motor and a reduction gear for driving an output member which moves a movable element relative to a reference element.

In the case of an automobile seat, the motorized hinges comprise a DC motor, a reduction gear, and a reduction hinge mechanism, in which one of the flanges is connected to the backrest and the other flange is connected to the seating part of the seat.

Such DC motors are relatively large in size and are generally in the form of a cylinder whose size constraints impose restrictions on its placement.

SUMMARY

There is therefore a need for a drive device with electric motor and reduction gear (which can also be called a 'gear motor') having dimensions which allow optimizing their placement, especially in a confined space such as within a vehicle seat or vehicle door for example.

Thus, in accordance with at least some embodiments of the invention, there is provided a drive device with electric motor and reduction gear, arranged to drive an output member in a motor vehicle, in a rotational movement about a main axis, comprising:

a brushless motor having a rotor turning about a rotor axis parallel to the main axis,
an elliptical reduction gear interposed between the brushless motor and the output member, said elliptical reduction gear comprising a drive member and a deformable elliptical ring deformed by the drive member during its rotation, against a supporting ring,
a control unit arranged in the immediate proximity of the brushless motor, for controlling said brushless motor.

In the present description, the term "brushless motor" is to be understood as equivalent to "electrically commutated motor". Similarly, the term "rpm" is to be understood as the number of revolutions per minute.

With these arrangements, the dimensions of such gear motors can be optimized to facilitate their installation.

This also reduces the weight and operating noise of such motor/reduction gear assemblies.

In various embodiments of the invention, one or more of the following arrangements may be used:

the reduction rate of the elliptical reduction gear is between 50 and 150 and the rotational speed of the motor is between 2000 rpm and 7000 rpm, which provides a standard reduction rate for the elliptical reduction gear and an optimal rotational speed for the motor;
the reduction gear and the motor are arranged coaxially, the rotor axis being coincident with the main axis, thereby reducing the radial space requirements;
the motor and the reduction gear are arranged one beside the other in a plane perpendicular to the main axis, and are connected together by a belt, thereby reducing the axial space requirements;
the control unit is arranged to control the motor according to current profiles which ramp up and down for smooth startups and shutdowns;
the control unit is arranged to control the motor with a safety shutdown function, thus preventing the motor from overheating in case of mechanical interference or failure;
the drive device further comprises a housing containing the control unit, the elliptical reduction gear, and the brushless motor, which improves the mechatronic integration.

The invention also relates to a frame for a motor vehicle seat, comprising a backrest frame, a seating part frame, and at least one reduction hinge mechanism connecting the backrest frame to the seating part frame, wherein a drive shaft is adapted to drive the reduction hinge, the drive shaft being coupled to a drive device as described above.

The seat frame may further comprise a second reduction hinge mechanism arranged on the side opposite the first reduction hinge mechanism, with the drive shaft passing axially through the elliptical reduction gear.

The invention in at least some other embodiments also provides a motor vehicle seat comprising at least one drive device as described above.

BRIEF DESCRIPTION OF THE DRAWINGS

Other features, objects, and advantages of the invention will become apparent from the following description of two of its embodiments, given by way of nonlimiting examples, with accompanying drawings in which.

The same references are used to denote identical or similar elements in the different figures.

DESCRIPTION OF THE ILLUSTRATED EMBODIMENTS

Figure 1:
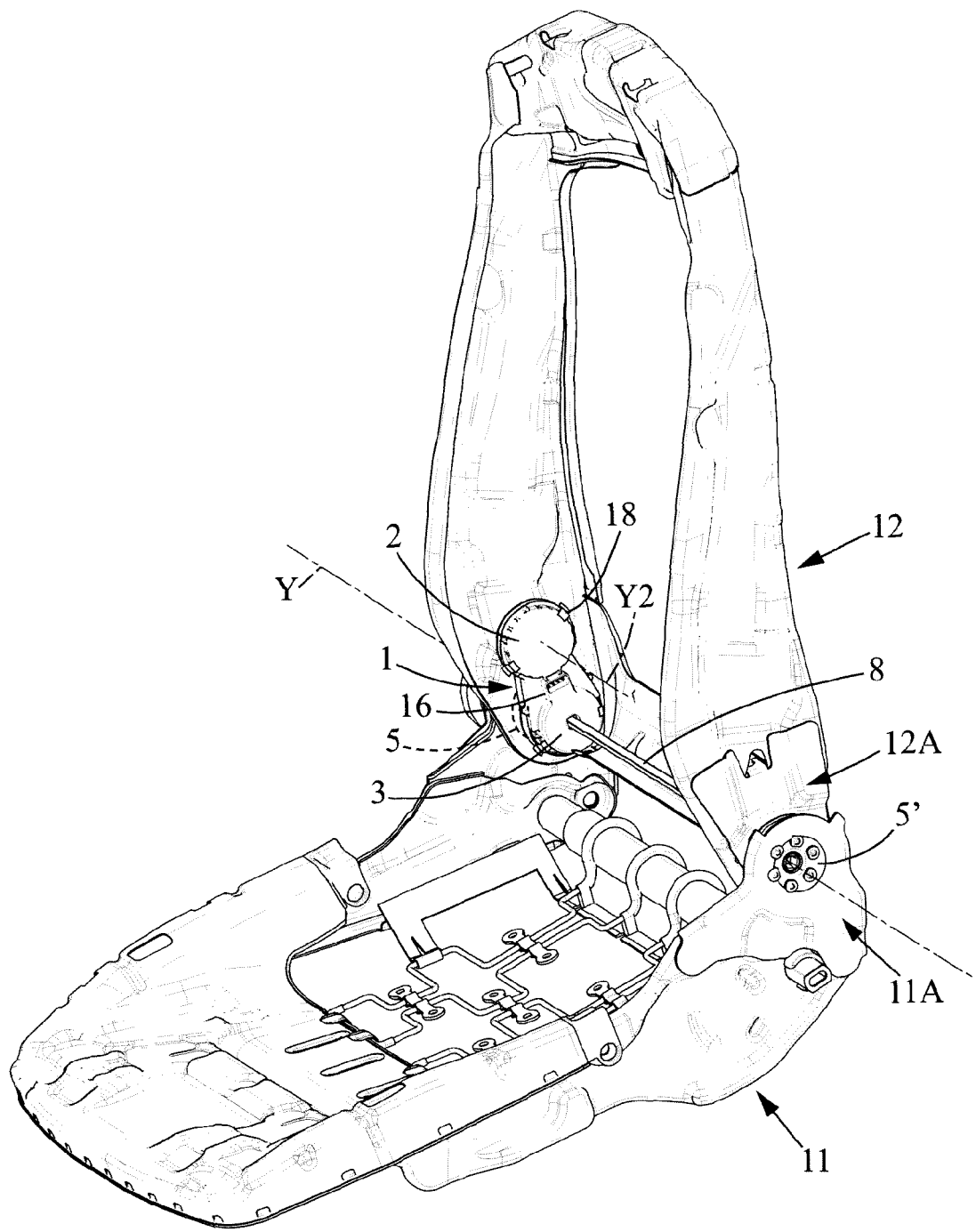
FIG. 1 is a perspective view of a seat frame incorporating a drive device according to a first embodiment of the invention.
Figure 2:
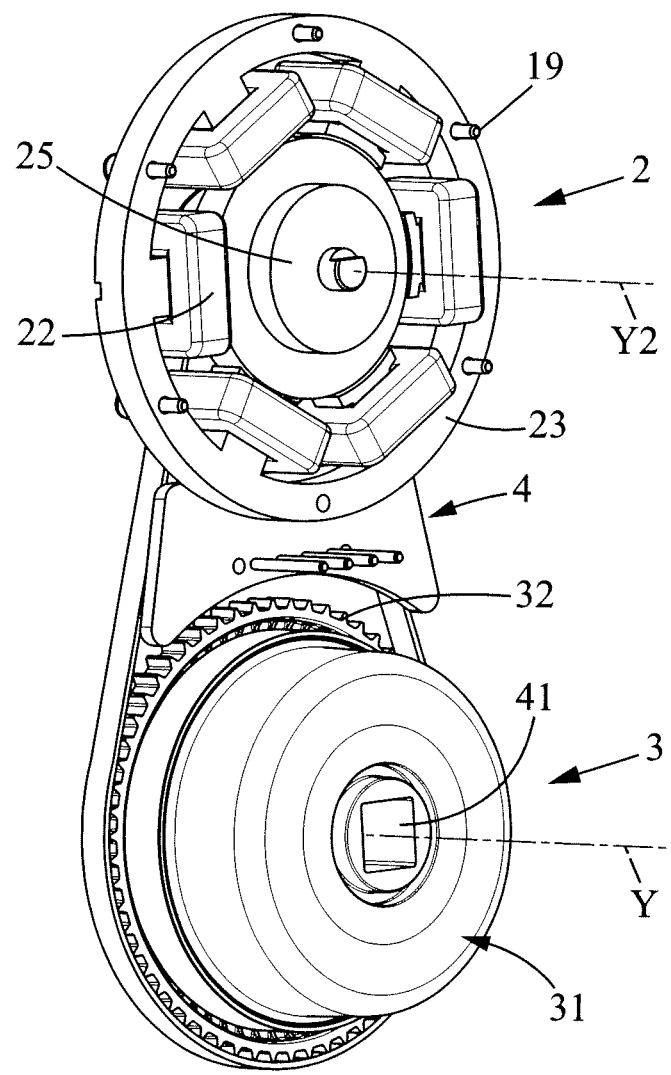
FIG. 2 is a partial perspective view of the drive device of FIG. 1.
Figure 3:
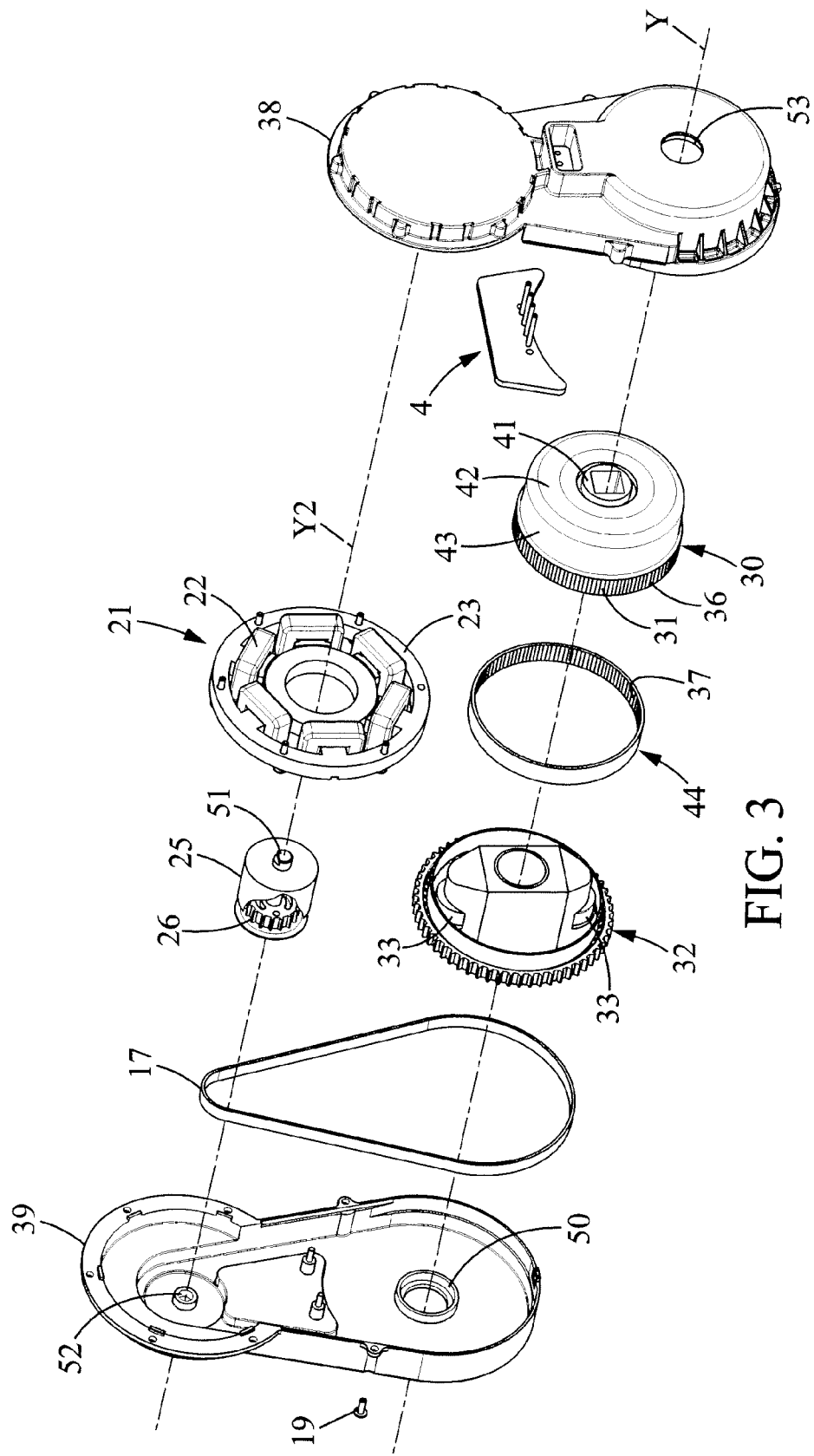
FIG. 3 is an exploded view of the drive device of FIG. 1.
Figure 4:
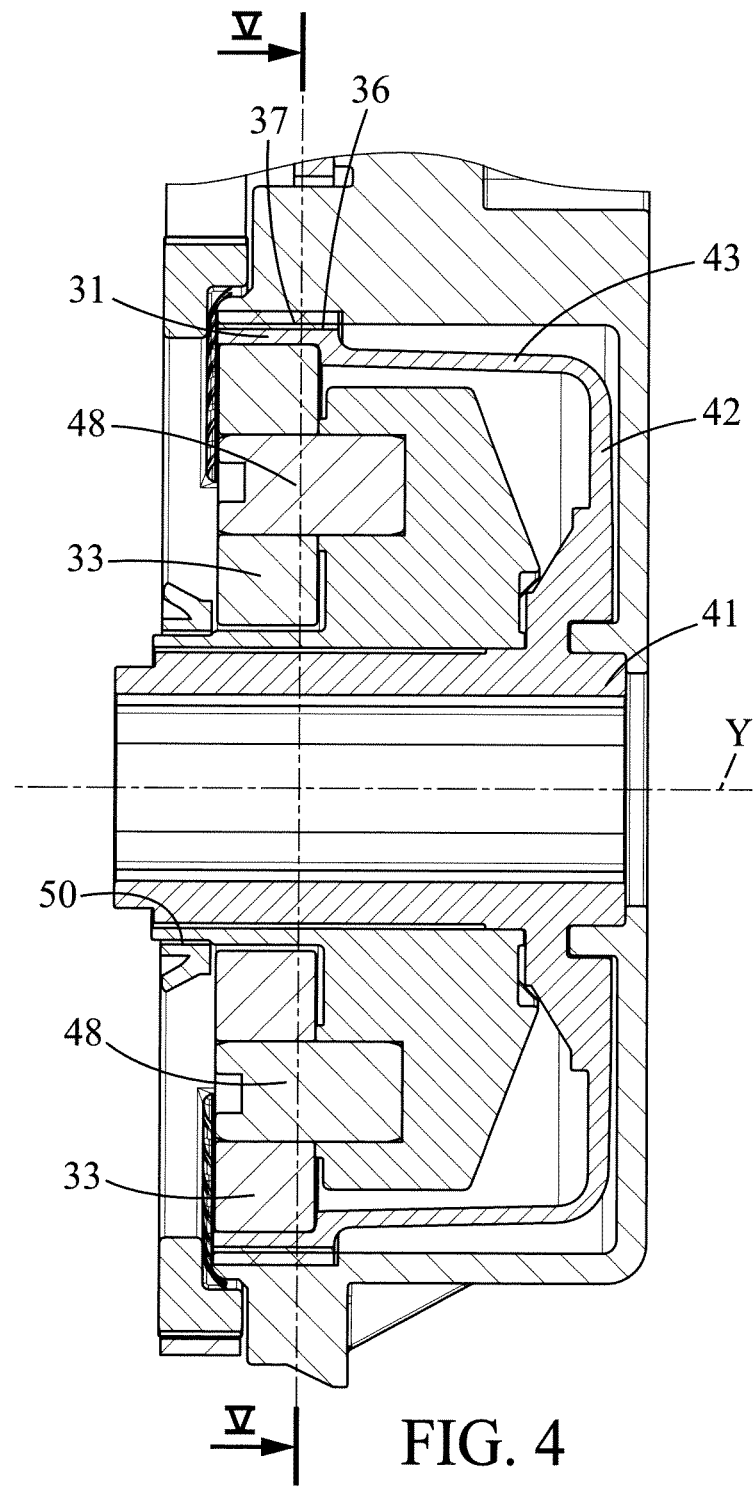
FIG. 4 is an axial cross-sectional view of the reduction gear of the drive device of FIG. 1.
Figure 5:
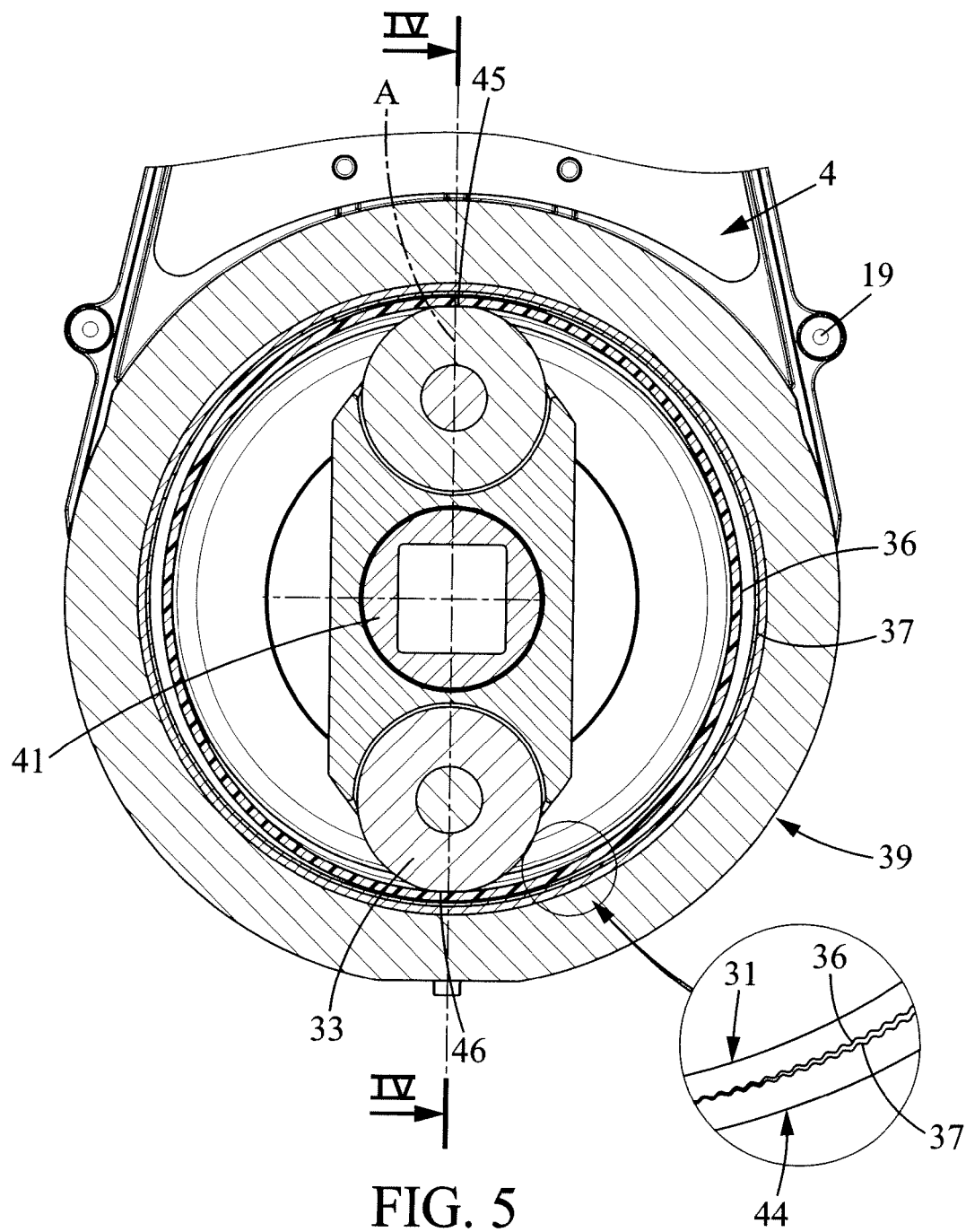
FIG. 5 is a radial cross-sectional view of the reduction gear of the drive device of FIG. 1, along line V-V of FIG. 4.

FIG. 1 shows a perspective view of a seat frame incorporating a drive device 1 according to a first embodiment of the invention. Such a frame is covered with padding and fabric (not shown) to form an automobile seat.

The frame in question comprises a seating structure 11 and a backrest structure 12 which is mounted on the seating structure 11 so as to rotate about a main hinge axis Y. In the hinge region, the seating structure 11 comprises a seating plate 11A and the backrest structure 12 comprises a backrest plate 12A, the two plates in question 11A, 12A being fixed to a reduction hinge mechanism 5. The hinge mechanism 5 can be, for example, a planetary gear mechanism as known in the art of motorized hinges.

As shown in FIG. 1, the drive device 1 causes the backrest to rotate relative to the seating part, in order to adjust the tilt to suit the user.

It should be noted that the drive device 1 can be arranged so that it displaces, in a motor vehicle, any movable element movably mounted relative to a reference element, via a hinge mechanism placed between the movable element and the reference element. This applies in particular to a mechanism in a seat or to a window lift mechanism in a car door.

As illustrated in FIGS. 1-5, the drive device 1 comprises:
- a brushless motor 2 having a rotor 25, rotating about a rotor axis Y2 parallel to the main axis Y,
- an elliptical reduction gear 3 interposed between the brushless motor 2 and an output member 8, the elliptical reduction gear comprising a drive member 32 and a deformable elliptical ring 31 deformed radially outward against a supporting ring 44 by the drive member during its rotation, as will be detailed further below,
- a control unit 4 arranged in the immediate proximity of the brushless motor 2, for controlling said brushless motor, said control unit 4 being connected to an electrical connector 16 provided for supplying power and electrical signals to the drive device 1.

More specifically, the drive device 1 comprises a protective housing in the form of two half-casings 38,39 assembled together by attachment means such as screws or rivets 19. This housing protects the internal components of the drive device 1, specifically the motor 2, the reduction gear 3, and the control unit 4.

The motor comprises a stator 21 having coils 22, an armature 23 of magnetic material, and a rotor 25. The rotor comprises a rotor shaft 51 supported by bearings 52 of axis Y2 arranged in the two half-casings 38,39.

As is known in the art of brushless motors, the rotor 25 is provided with permanent magnets which move with the rotor 25 opposite the coils 22. The current flowing through each coil 22 is controlled to generate a rotating magnetic field capable of imparting a rotational movement to the rotor. The rotational speed of the rotating field and the slip rate of the rotor can be controlled by the control unit 4. Typically, rotational speeds of between 2000 rpm and 7000 rpm are chosen.

Connected to the rotor 25 is an output gear 26 of the motor 2, which itself is connected to a transmission belt 17, for example of elastomer, for example a toothed belt.

As an alternative to a belt, the transmission may be based on a conventional gear system with pinion or any other transmission means.

The transmission belt 17 drives a drive member 32 which is part of the elliptical reduction gear 3 on which are mounted two rollers 33 whose axes define the major axis A of an ellipse.

The reduction gear 3 comprises, in addition to said drive member 32, a wheel 30 that has a general bowl shape with a central hub 41, a disk 42 forming the bowl bottom, an annular rim 43, and a deformable ring 31 which extends said rim 43. The deformable ring 31 is provided with a first set of external peripheral teeth 36. This deformable ring or flange 31 has an annular shape when at rest and not subjected to external forces. However, in the reduction gear configuration shown, the major axis A of the drive member deforms this ring radially outward.

The wheel 30 is supported in a rotational journal bearing arrangement, by bearings 50,53 arranged in the protective housing on axis Y within the half-casings 38,39.

The reduction gear 3 comprises a supporting ring 44 with a second, fixed, set of teeth 37 that are stationary relative to the protective housing and pointing radially inward. The first and second sets of teeth 36,37 engage with each other over at least a portion of the periphery, as shown, and preferably at two diametrically opposite areas 45,46 corresponding to the major axis A of the ellipse.

In contrast, the radius of the deformable ring 31 is smaller in the other peripheral areas and the two sets of teeth do not engage, therefore the deformable ring constitutes an elliptical ring characterizing the reduction gear.

Furthermore, the number of teeth in the first set of teeth 36 is different from the number of teeth in the second set 37; the difference may be a single tooth or several teeth.

As a result, each time the drive member 32 completes a rotation, the deformable flange 31 and therefore the wheel 30 is displaced angularly by the number of teeth corresponding to said difference.

It should be noted that the shape of the teeth 36,37 may be selected from any form known for such teeth, particularly on the basis of the stresses the drive device is subjected to and any noise limitations during operation.

For example, in a preferred configuration, the number of teeth in the first set of teeth is 100 and the number of teeth in the second set is 99, thus obtaining a reduction rate of 100. In general, a reduction ratio of between 50 and 150 is chosen.

These choices allow obtaining a standard reduction rate for the elliptical reduction gear and an optimum rotational speed for the motor.

According to the first embodiment, the reduction gear and the brushless motor 2 are arranged next to one another substantially in a plane perpendicular to the main axis Y, and are connected to each other by the belt 17. This provides a 'flat' configuration having an advantageously small dimension along the Y axis, for example less than 4 cm, and the device can be installed on the interior side against the plate of the backrest 12.

The output member 8, coupled to the central hub 41, acts as a shaft 8 which drives at least one reduction hinge mechanism 5. In the example shown, the shaft 8 has a square cross-section and drives two hinge mechanisms 5,5': a first hinge mechanism 5 located on the side of the drive device 1 and a second hinge mechanism 5' located on the opposite side.

The shaft 8 passes through the reduction gear 3 from one side to the other, at said hub 41 which has a square opening at its center.

The control unit 4 is configured to control the current in each coil, and to monitor the proper operation of the brushless motor.

Figure 9:
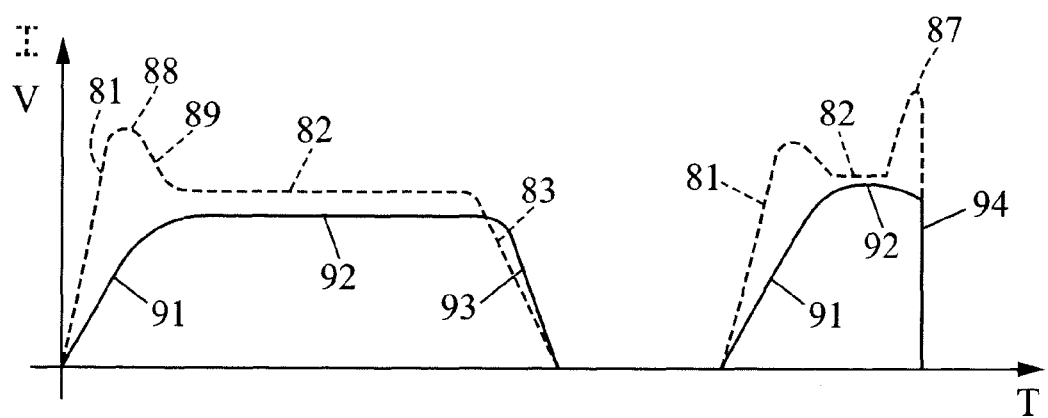
FIG. 9 shows timing diagrams for controlling the motor.

In particular, the control unit 4 can control the motor according to current profiles which ramp up for startups and ramp down for shutdowns, as detailed below and as illustrated in FIG. 9. This provides smooth startups and shutdowns. This also limits the emission of the electromagnetic interference associated with startup and shutdown transitions.

Figure 6:
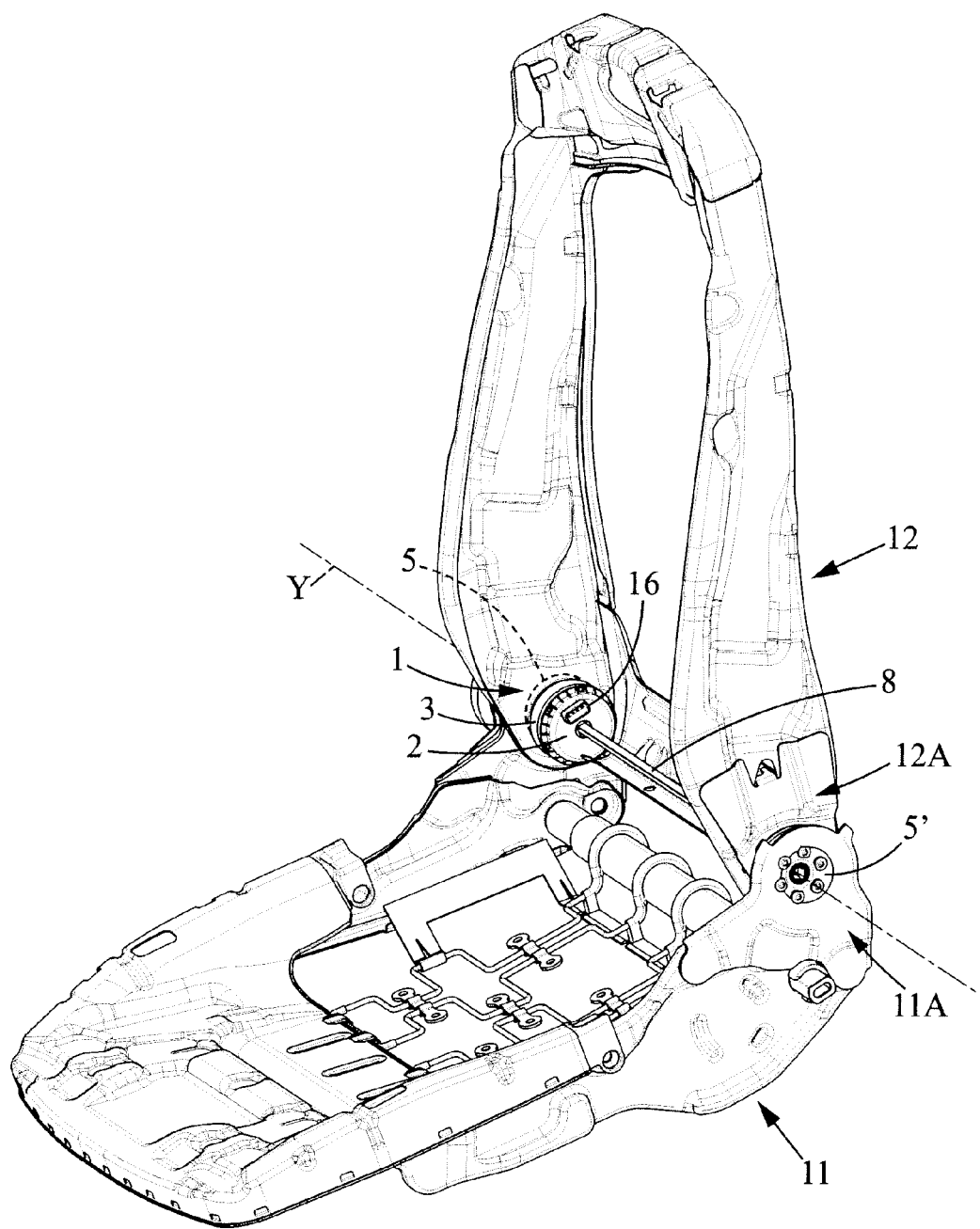
FIG. 6 is a perspective view of a seat frame incorporating a drive device according to a second embodiment of the invention.
Figure 7:
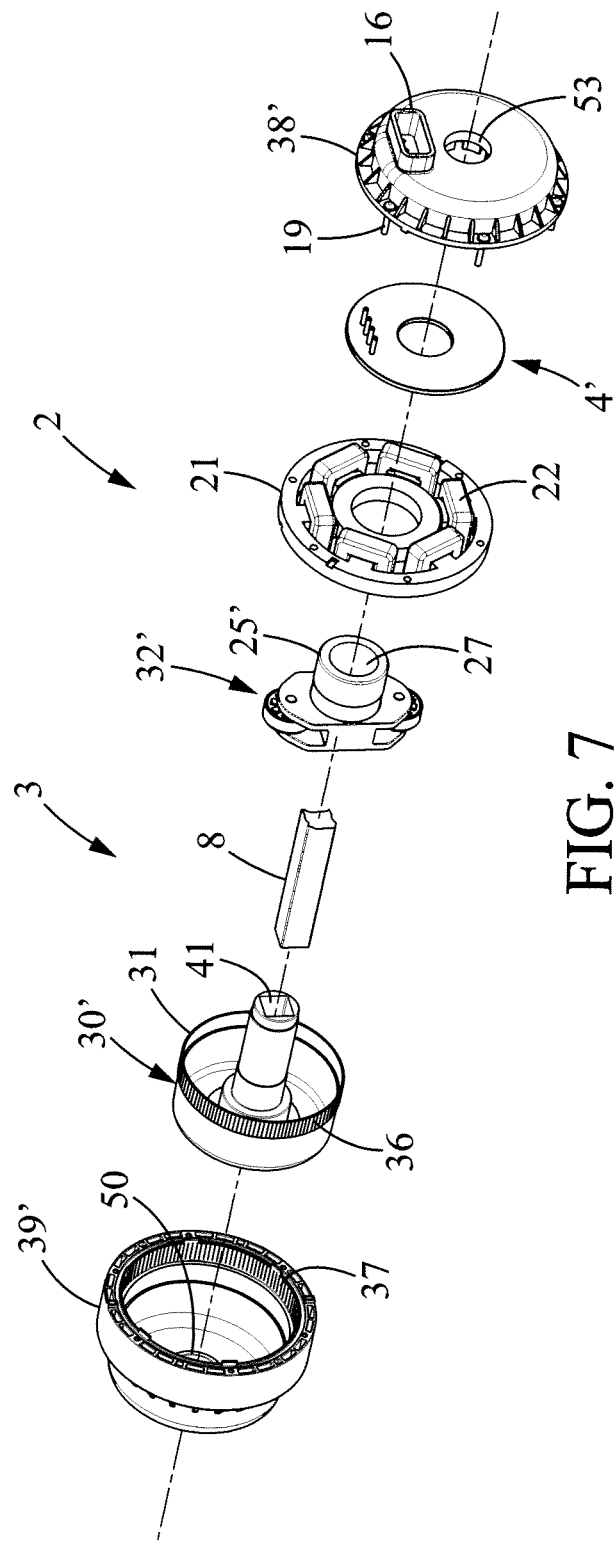
FIG. 7 is an exploded view of the drive device of FIG. 6,
FIG. 8 partially shows the drive device of FIG. 6, viewed from the side of the reduction gear.
Figure 8:
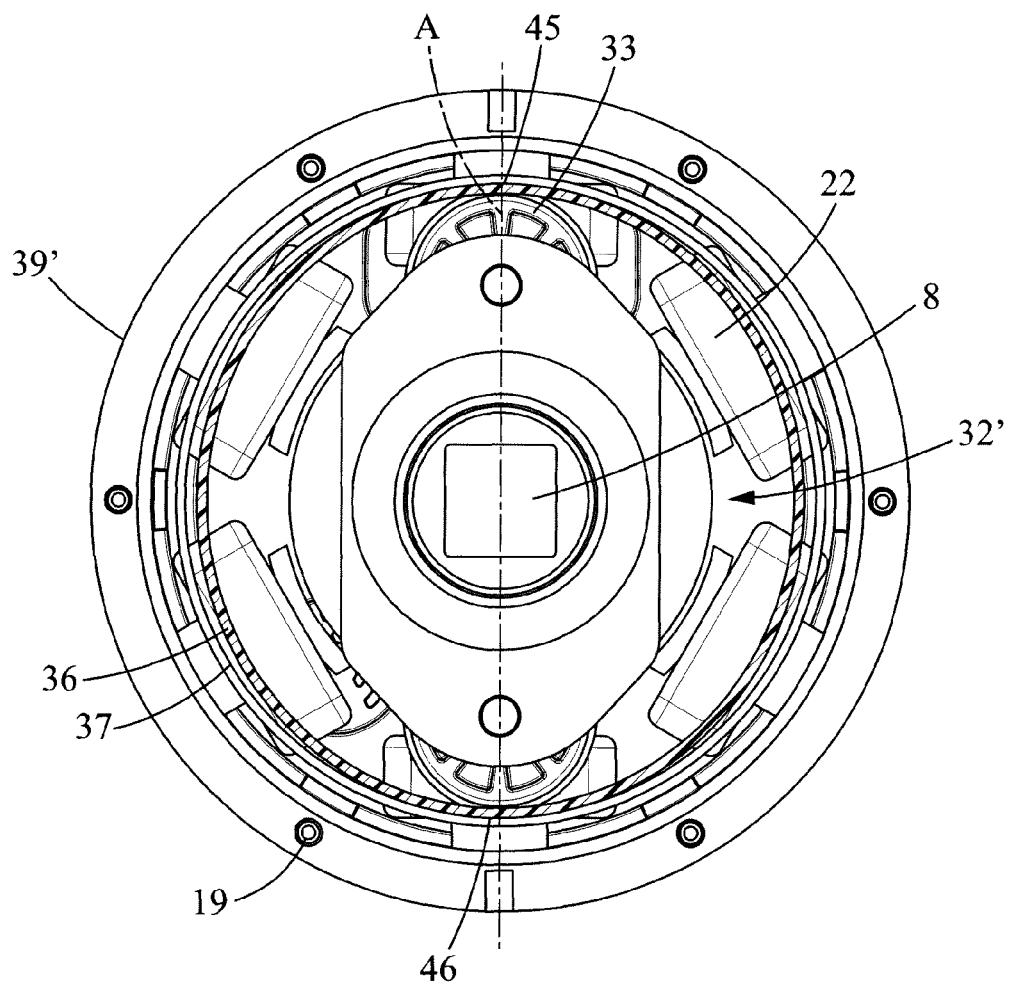

In a second embodiment, shown in FIGS. 6 to 8, the reduction gear 3 and the brushless motor 2 are arranged coaxially, one at the end of the other, the axis of the rotor Y2 being coincident with the main axis Y. This provides an "axial cylindrical" configuration, meaning with an advantageous radial dimension, e.g. a diameter of less than 6 cm, and the device can be installed against the interior side of the backrest 12 flange, as shown in FIG. 6.

In this second embodiment, only the elements that differ from those of the first embodiment will be discussed, as the others are considered to be similar or identical.

The protective housing comprises two half-casings 38', 39' secured together by attachment means 19 and secured to the backrest 12 frame by means not represented but similar to the clips 18 represented for the first embodiment.

The control unit 4' has a different physical form, being a disk with a central hole, but it performs the same functions as the control unit 4 of the first embodiment.

The rotor 25' is directly coupled to the drive member 32' by a direct coupling, with no belt involved.

In the second embodiment, the shaft 8 passes through an axial through-hole 27 arranged in the rotor 25' of the motor and through the control unit 4'.

The drive member 32' comprises rollers whose axes define the major axis A of the ellipse.

The wheel 30' comprises elements similar to the wheel 30 described for the first embodiment, in particular a central hub with an opening of square cross-section and a first set of external peripheral teeth 36 which engage, at the ends of the major axis of the ellipse formed by the deformable ring 31, with a second set of teeth 37 arranged directly in the half-casing 39'.

FIG. 9 illustrates timing diagrams for the control of the motor by the control unit 4,4'. The first timing diagram illustrates a normal control sequence with ramping up at startup and ramping down at shutdown, the speed being represented by the solid line and the current by the dotted line. When the control unit initiates a sequence of movement (signaled by user pressure on a switch or a return to a preset position for example), the motor is controlled by ramping up the current 81 from 0 to a bump 88 followed by a decrease 89 to a stable current 82. Meanwhile, the rotor speed 91 is gently ramped up from 0 to the stable speed 92. When the rotation is to be stopped, the control unit begins ramping down so that the current 83 and the speed 93 substantially decrease together down to 0.

A second timing diagram illustrates a safety shutdown: the beginning of the sequence is the same as above, but at a certain moment after reaching stability the control unit 4,4' detects a fault during operation, for example an obstacle preventing movement, causing an increase in current 87 and a decrease in speed. The control unit immediately ceases the output control 94 and the speed very quickly drops to 0.

It should be noted that the control unit 4,4' can handle several additional functions, such as managing stored positions, compensating for variations in supply voltage, providing support for diagnostics, etc.

The invention claimed is:

1. A drive device with electric motor and reduction gear, arranged to drive an output member in a motor vehicle, in a rotational movement about a main axis, comprising:
a brushless motor having a rotor turning about a rotor axis parallel to the main axis,
an elliptical reduction gear interposed between the brushless motor and the output member, said elliptical reduction gear comprising a drive member and a deformable elliptical ring deformed by the drive member during its rotation,
a control unit arranged in the immediate proximity of the brushless motor, for controlling said brushless motor,
and wherein the reduction gear and the brushless motor are arranged one beside the other in a plane perpendicular to the main axis, and are connected together by a belt.

2. The drive device according to claim 1, wherein the reduction rate of the elliptical reduction gear is between 50 and 150 and the rotational speed of the motor is between 2000 revolutions/min and 7000 revolutions/min.

3. The drive device according to claim 1, wherein the control unit is arranged to control the motor according to current profiles which ramp up and down for startup and shutdown.

4. The drive device according to claim 1, wherein the control unit is arranged to control the motor with a safety shutdown function.

5. The drive device according to claim 1, further comprising a housing containing the control unit the elliptical reduction gear, and the brushless motor.

6. A frame for a motor vehicle seat, comprising a backrest frame, a seating part frame, and at least one reduction hinge mechanism connecting the backrest frame to the seating part frame, wherein a drive shaft is adapted to drive the reduction hinge, the drive shaft being coupled to a drive device according to claim 1.

7. The frame for a motor vehicle seat according to claim 6, comprising a second reduction hinge mechanism arranged on the side opposite the first reduction hinge mechanism, with the drive shaft passing axially through the elliptical reduction gear.

8. A motor vehicle seat comprising at least one drive device according to claim 1.

* * * * *